May 20, 1924.
P. C. SEEL
PROCESS OF MANUFACTURING CELLULOSE ACETATE
Filed Aug. 18, 1923
1,494,816
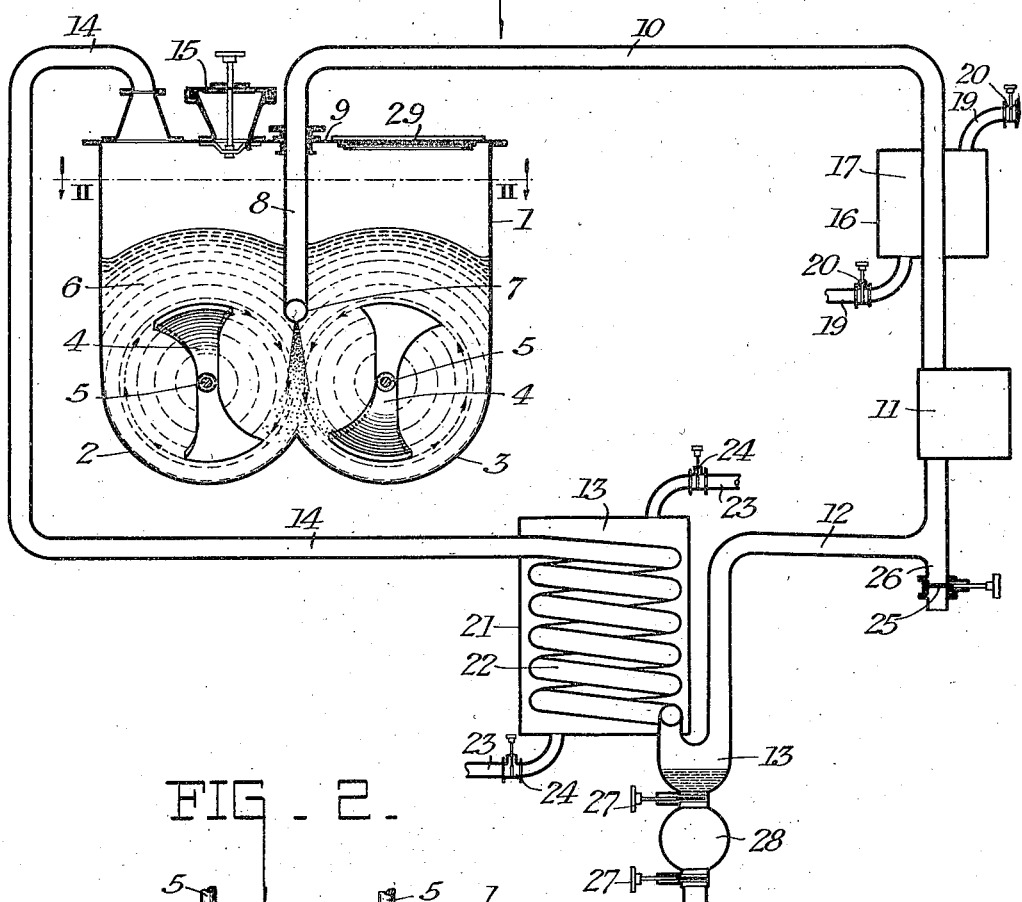
FIG _ 1 _
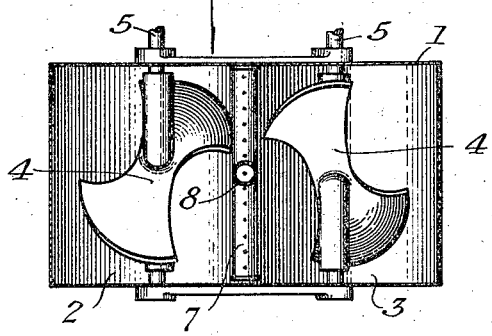
FIG _ 2 _
INVENTOR.
Paul C. Seel,
BY R. L. Stinchfield
ATTORNEY.

Patented May 20, 1924.

1,494,816

UNITED STATES PATENT OFFICE.

PAUL C. SEEL, OF ROCHESTER, NEW YORK.

PROCESS OF MANUFACTURING CELLULOSE ACETATE.

Application filed August 18, 1923. Serial No. 658,109.

*To all whom it may concern:*

Be it known that I, PAUL C. SEEL, a citizen of the United States of America, residing at Rochester, in the county of Monroe and State of New York, have invented certain new and useful Improvements in Processes of Manufacturing Cellulose Acetate, of which the following is a full, clear, and exact specification.

This invention relates to processes of manufacturing cellulose acetate. One object of the invention is to lessen the cost of such manufacture. Another object of the invention is to provide a simple, rapid, and inexpensive process for recovering acetic values, such as acetic acid and acetic anhydride from the cellulose acetate reaction mixture. Still another object of the invention is to provide a process for recovering acetic values in a comparatively pure state without expensive chemical operations. A further object of the invention is to provide a process in which a gaseous vehicle, such as air, is so used that it will take up vapors of the acetic values quickly and efficiently. Another object of the invention is to provide a process in which the reaction mixture is brought to and maintained in such a condition that it provides greatly increased surface for the evaporation of volatile acetic values. Another object of the invention is to obtain the cellulose acetate, freed from the bulk of acetic values, in a form having a large aggregate surface which facilitates liquid treatment by washes, reaction baths, and solvents. Other objects will hereinafter appear.

In the drawing,—

Fig. 1 is a diagrammatic side elevation, partly in vertical section, showing one form of apparatus in which my process may be carried out, the relative sizes of the parts being exaggerated for the sake of clearness;

Fig. 2 is a horizontal sectional view of the mixing unit taken on the line II—II of Fig. 1.

Cellulose acetate is produced by the action of suitable acetylating agents on cellulose in the presence of catalysts. The reaction mixture may, for example, initially comprise cellulose, acetic anhydride, acetic acid and sulfuric acid, and the products of the reaction as the latter proceeds. An example of this general type is given in United States Reissue Patent No. 12,637, Miles, Apr. 23, 1907. The acetylating reaction is at first carried on until a chloroform-soluble cellulose acetate is produced. Then a hydrolyzing mixture containing a relatively small amount of water is introduced until the reaction converts the cellulose acetate into the acetone-soluble form. Before the hydrolyzing mixture acts, the excess or unused acetic anhydride is converted into acetic acid by the addition of the proper amount of water. Sufficient water can be introduced in the hydrolyzing mixture to "kill" the acetic anhydride and cooperate in the conversion of the cellulose acetate.

If the reaction is terminated when the cellulose acetate is in the chloroform-soluble stage, a considerable amount of acetic values remain, such as acetic anhydride and acetic acid (and in some cases acetyl chloride). If the reaction be carried to the point where acetone-soluble cellulose acetate is produced, the acetic values will be in the form of acetic acid. Because of the relatively high value of these acetic values, they have a very important bearing upon the cost of the cellulose acetate which is produced. Their recovery substantially in condition for further acetylation, when effected inexpensively, greatly lowers the total cost of the manufacturing operations and thereby cheapens the cost of the product.

The reaction mixture has heretofore been washed with a considerable excess of water to free it from the acetic values. The recovery of these values from the comparatively dilute solutions which are produced can be carried out only at considerable expense. Water evaporating steps and chemical reaction steps have proven to be complicated and undesirably expensive.

I have found that the recovery of the acetic values can be simply and inexpensively carried out by separating at least the major portions of the acetic values from the reaction mixture by means of a gaseous vehicle, such as air. Preferably I pass the vehicle through the reaction mixture to take up vapors of the acetic values and then recover the values from the laden vehicle by condensation, absorption, or the like. I have found it preferable to pass the gas through the reaction mixture in a subdivided form, such as by forcing air bubbles through it, so that a large amount of surface is presented through which vapors of the acetic values may enter the gas. The reaction mixture is, broadly speaking, liquid, by which I mean that it is flowable to a certain extent, even when it is sometimes thickened to a pasty condition.

I have likewise found that the recovery of the acetic values is greatly facilitated by repeatedly circulating the gaseous vehicle, such as air, through the reaction mixture and the zone or station where the acetic values are removed from it. This recirculation enables the use of a stronger concentration of the vapors of acetic values in the air current, facilitating condensation, and prevents an unremoved fraction of these values being wasted in the manner that would take place if the air were discharged into the atmosphere to carry away the unextracted vapors.

I have also discovered that when the gaseous vehicle is agitated through the reaction mixture for a sufficient time the latter changes from a liquid or viscous form to a mass of separate particles of a somewhat powdery nature. The aggregate surface of there particles is much greater than the surface of the original reaction mixture. I have found that advantage can be taken of this large surface in the treatment of additional amounts of reaction mixture. When these amounts are stirred into the powdery mass and a gaseous vehicle is passed through, the additional amounts of reaction mixture are quickly converted to a subdivided or powdery condition, because of the increased rapid evaporation taking place from the enlarged surface.

My process may be carried out in many types of apparatus, the one shown in the drawing being merely illustrative of a useful form. The main receptacle in which the gaseous vehicle and reaction mixture are brought into intimate contact is indicated at 1. This is preferably an airtight vessel, except for the piping hereinafter described. It may conveniently take the form of a well known mixer in which the bottom is divided into two troughs 2, 3 above which are located mixing blades 4 rotated with shafts 5, driven by any suitable means (not shown). These blades may be of a form which merely turns the material about the shafts, but I prefer to use blades which give a longitudinal movement to the mixture also. See, for example, U. S. Patent No. 534,968, Pfleiderer, Feb. 26, 1895. The receptacle may be temperature controlled by steam jackets or coils or any other well known and customary way.

Entering into the reaction mixture 6 is a perforated transverse pipe 7. This connects with a vertical pipe 8 which passes through an airtight connection in the top 9. Pipe 8 is in turn connected by pipe line 10 with an air compressor or blower 11. The latter draws its supply of air through pipe 12 from the removal or recovery unit 13, which is in turn connected by pipe 14 with the top 9 of receptacle 1. In the top 9 of the receptacle 1 there is also located a normally closed or sealed loading fixture or pipe 15.

I find it useful to have a heating unit 16 for slightly warming the gaseous vehicle before it enters the main mixing receptacle 1. This is indicated diagrammatically in the drawing as a casing 17 surrounding a section of pipe 10, through which warm water or exhaust steam is passed through pipes 19 controlled by valves 20. The removal station 13, where vapors of acetic values (usually the vapors of acetic acid) are separated from the air, may take the form of any well known absorption or condensation tower. This is conventionally indicated in Fig. 1 as a cooling chamber 21 surrounding a coil 22, the cooling medium being passed in and out by means of pipes 23 controlled by valves 24. The entrance of additional air when required may be conveniently effected by manipulating valve 25 in pipe 26.

In carrying out my process in this apparatus a reaction mixture, such as any one of those shown at the different stages in the Miles patent cited above, is charged into receptacle 1 through pipe 15 until it rises above perforated pipe 7. The blades 4 are set in operation and the compresser or blower 11 started to force air through pipes 10, 8, and 7 into the reaction mixture 6. The bubbles thus formed in the mixture are agitated or forced through the material, the blades 4 assisting in this action. During this period the bubbles of the gaseous vehicle take up as much vapor of the acetic values as they can hold at the prevailing temperature. I have found it convenient to operate with the receptacle 1 and its contents at 80 to 85° F., but, of course, the thermal factors of a particular apparatus can be readily understood by those skilled in the art.

The bubbles of the vehicle, rising from the reaction mixture 6 and thoroughly laden with vapors of the acetic values, are drawn through pipe 14 to the removal zone 13, where they are condensed and may be drawn off through valves 27 in enlarged pipe 28. The amount of vapor which is condensed and removed at station 13 depends primarily upon the difference in temperature between it and receptacle 1. The condensing temperature is kept as low as practical without solidifying the acetic values which are condensed in it. I have found 60° F. to be useful when there is a slight amount of water present, because it enables the acetic acid to be condensed in the liquid form without clogging the condenser. This temperature, however, is of course, subject to adjustment, as will be understood by those skilled in the art. There will, of course, be some vapor of acetic values left in the air after it leaves the condenser and when it reenters the mixture 6, but the amount is sufficiently below the saturation point to avoid interference with the process. In fact, it assists the dividing of the mixture into small particles, and assists the rate of evaporation because it prevents too hard and impervious a skin forming on the pieces of the mixture.

The cooled vehicle is drawn through pipe 12 by the compresser or blower 11. If a compresser is employed, it often times warms the air up sufficiently to permit it to function properly when it passes through pipe 10 to the receptacle 1. I have found this to be true in one form of apparatus where the compresser is operating at from 3 to 5 pounds pressure. When, however, the compresser does not adequately warm the vehicle, or when a blower is employed, it is preferable to reheat the air to the required temperature (say 80 or 90° F.) by means of heating unit 16.

As the removal of the acetic values from the reaction mixture 6 progresses, the latter changes over from a viscous or pasty liquid to a powdery form comprising a mass of substantially separate particles,—at least they are sufficiently separate to permit the air to pass in between them when moved about by blades 4. When this stage is reached I add further amounts of reaction mixture through pipe 15 and continue the circulation of the air through the mass of reaction particles and the rest of the described apparatus. In this way the additional amounts of reaction mixture are distributed over the surfaces of the particles, which surfaces in the aggregate are relatively large compared to that of the original liquid. In this way the circulating vehicle is repeatedly brought into contact with the additional reaction mixture and quickly removes vapors of acetic values from it. The powdery mass is increased by repeating the charging of additional reaction mixture and continuing the blowing. The powdery mass may thus be gradually built up until it approaches the top of receptacle 1 may then be removed through any suitable door, such as 29, in receptacle 1.

The addition of the reaction mixture during the building up of the powdery mass may be carried out intermittently or continuously, but in any event the rate of charging in the mixture and the rate of passing the air through the mass are so correlated that the powdery condition will be kept up substantially enough to secure the advantages due to its increased evaporating surface.

While the acetic acid vapors may be absorbed by bubbling the vapor-laden air through a suitable liquid and then distilling the acid from such liquid, nevertheless I greatly prefer to use the condensation method described above, because it recovers the acetic values in a form sufficiently pure for re-use in further acetylation.

The powdery mass, because of its very large surface relative to its weight, can be very rapidly treated by liquids in the further steps of manufacture, such as by water for washing, or baths for further hydrolysis, or by solvents.

Having thus described my invention, what I claim as new and desire to secure by Letters Patent is:

1. In the process of manufacturing cellulose acetate, the step of passing a gaseous vehicle through a cellulose acetate reaction mixture containing volatile acetic values to carry away vapors of said values.

2. In the process of manufacturing cellulose acetate, the step of forcing air through a cellulose acetate reaction mixture containing acetic acid to remove acetic acid therefrom.

3. In the process of manufacturing cellulose acetate, the step of forcing a gaseous vehicle in subdivided form through a cellulose acetate reaction mixture containing volatile acetic values to increase the area of contact between the mixture and vehicle and carry away vapors of acetic values therefrom.

4. In the process of manufacturing cellulose acetate, the step of forcing air bubbles through a cellulose acetate reaction mixture containing acetic acid to carry away vapors of said acid.

5. In the process of manufacturing cellulose acetate, the steps of passing a gaseous vehicle through a cellulose acetate reaction mixture containing volatile acetic values to carry away vapors of said values, and removing acetic values from said vapor-laden vehicle.

6. In the process of manufacturing cellulose acetate, the steps of forcing air through a cellulose acetate reaction mixture containing acetic acid to carry away acetic acid and removing acetic acid from said air.

7. In the process of manufacturing cellulose acetate, repeatedly circulating a gaseous vehicle through a cellulose acetate reaction mixture containing volatile acetic values to take up vapors of said values and through a removal zone for removing acetic values from the vehicle.

8. In the process of manufacturing cellulose acetate, repeatedly circulating air through a cellulose acetate reaction mixture containing acetic acid to take up the latter and through a condensing zone for separating acetic acid from said air.

9. In the process of manufacturing cellulose acetate, repeatedly circulating a gaseous vehicle through a cellulose acetate reaction mixture containing volatile acetic values to take up vapor of said values, through a cooling zone for removing vapor of said values from said vehicle, and through a warming zone to restore the original temperature of said vehicle.

10. In the process of manufacturing cellulose acetate, removing volatile acetic values from a liquid cellulose acetate reaction mixture containing the same by passing a gaseous vehicle into contact with said mixture to carry away vapor of said values until said mixture is changed to a mass of substantially separate particles.

11. In the process of manufacturing cellulose acetate, the steps of passing a gaseous vehicle with agitation into contact with a liquid cellulose acetate reaction mixture containing volatile acetic values to carry away vapors of said values until said mixture is changed to a mass of substantially separate particles, spreading among said particles an additional amount of such mixture and passing such gaseous vehicle through said mass to carry away vapors of acetic values from said additional amount, the mass of particles being thereby increased.

12. In the process of manufacturing cellulose acetate, the steps of forcing a gaseous vehicle with agitation into contact with a normally liquid cellulose acetate reaction mixture containing acetic acid to carry away acetic acid until said mixture is changed to a mass of particles having a greater aggregate surface than the surface of the original mixture, spreading an additional amount of such mixture among the surfaces of said particles and passing such vehicle among the particles to carry away acetic acid from said additional amount, the rate of spreading and the rate of passing the vehicle being correlated to effectively maintain said mass in the form of particles with large aggregate surface, thereby increasing the rate of removal of acetic acid and building up the mass of particles.

13. In the process of manufacturing cellulose acetate, the step of forcing a gaseous vehicle in subdivided form through a normally liquid cellulose acetate reaction mixture containing volatile acetic values until sufficient of said values are removed to change the mixture into a mass of substantially separate particles.

14. In the process of manufacturing cellulose acetate, agitating air bubbles through a liquid cellulose acetate reaction mixture containing acetic acid thereby ladening the air with acetic acid vapor, and removing the laden air until the mixture assumes a powdery consistency.

15. In the process of manufacturing cellulose acetate, the steps of agitating a gaseous vehicle in subdivided form through a cellulose acetate reaction mixture containing volatile acetic values, thereby ladening the vehicle with vapor of said acetic values, removing the laden vehicle until the mixture changes to a powdery mass, mixing into said mass more of such reaction mixture, and passing such vehicle through the mass to carry away further acetic values, the powdery mass being thereby increased.

16. In the process of manufacturing cellulose acetate, the steps of agitating air bubbles through a liquid cellulose acetate reaction mixture containing acetic acid, to laden the air with acetic acid vapor, removing the laden air until the mixture changes to a mass of powdery consistency, mixing into said mass further amounts of such reaction mixture, passing air through said mass to remove vapors of acetic acid from said further amounts, the mixing in of said further amounts and the passing of the air being correlated to maintain the powdery consistency of the mass.

17. In the process of manufacturing cellulose acetate, removing volatile acetic values from a liquid cellulose acetate reaction mixture containing the same by passing a gaseous vehicle into contact with said mass to carry away vapor of said values until said mixture is changed to a mass of substantially separate particles, and separating acetic values from said vehicle.

18. In the process of manufacturing cellulose acetate, the steps of passing a gaseous vehicle with agitation into contact with a liquid cellulose acetate reaction mixture containing volatile acetic values to carry away vapors of said values until said mixture is changed to a mass of substantially separate particles, spreading among said particles an additional amount of such mixture and passing such gaseous vehicle through said mass to carry away vapors of acetic values from said additional amount, the mass of particles being thereby increased, and separating acetic values from said vehicle.

19. In the process of manufacturing cellulose acetate, repeatedly circulating a gaseous vehicle through a liquid cellulose acetate reaction mixture containing volatile acetic values to take up vapors of said values, and through a removal zone for removing acetic values from the vehicle, the circulation being continued until the mixture changes to a mass of substantially separate particles.

20. In the process of manufacturing cellulose acetate, repeatedly circulating a gaseous vehicle through a liquid cellulose acetate reaction mixture containing volatile acetic values to take up vapors of said values, and through a removal zone for removing acetic values from the vehicle, the circulation being continued until the mixture changes to a mass of substantially separate particles, spreading among said particles additional reaction mixture, repeating said circulating to remove and recover acetic values from said additional reaction mixture, the mass of particles being thereby increased.

21. In the process of manufacturing cellulose acetate, repeatedly circulating air through a liquid cellulose acetate reaction mixture containing acetic acid to take up vapor of said acid and through a condensing zone in which acetic acid is separated from the air; said circulating being continued until said mixture becomes a powdery mass, mixing further reaction mixture into said mass, and circulating air through said mass and said condensing zone to remove and recover acetic acid from said further reaction mixture, the rates of mixing and circulating being correlated to substantially maintain a powdery condition with a large evaporation surface.

Signed at Rochester, New York, this 6th day of August, 1923.

PAUL C. SEEL.